(12) United States Patent
Krikor et al.

(10) Patent No.: US 8,865,278 B2
(45) Date of Patent: Oct. 21, 2014

(54) POLYMERIC MATERIAL FOR MAKING A PACKAGING ARTICLE HAVING OXYGEN-BARRIER PROPERTIES AND LOW LIGHT TRANSMISSION PROPERTIES

(75) Inventors: Hilde Krikor, Deurne (BE); Silvia Tarrago, Kalmthout (BE); Cor Jansen, Awryen (NL)

(73) Assignee: La Seda de Barcelona S.A., Barcelona (ES)

( * ) Notice: Subject to any disclaimer, the term of this patent is extended or adjusted under 35 U.S.C. 154(b) by 355 days.

(21) Appl. No.: 13/139,652

(22) PCT Filed: Dec. 1, 2009

(86) PCT No.: PCT/EP2009/008547
§ 371 (c)(1),
(2), (4) Date: Jun. 14, 2011

(87) PCT Pub. No.: WO2010/069460
PCT Pub. Date: Jun. 24, 2010

(65) Prior Publication Data
US 2011/0244155 A1    Oct. 6, 2011

(30) Foreign Application Priority Data

Dec. 16, 2008 (EP) .................................. 08021795

(51) Int. Cl.

| | |
|---|---|
| *B32B 1/02* | (2006.01) |
| *B32B 23/00* | (2006.01) |
| *C08L 67/02* | (2006.01) |
| *C08L 77/00* | (2006.01) |
| *C08L 67/00* | (2006.01) |
| *B65D 1/02* | (2006.01) |
| *B32B 1/08* | (2006.01) |
| *C08K 3/20* | (2006.01) |
| *C08K 3/10* | (2006.01) |
| *C08K 3/24* | (2006.01) |
| *C08L 77/06* | (2006.01) |
| *C08K 3/36* | (2006.01) |

(52) U.S. Cl.
CPC ................ *B65D 1/0207* (2013.01); *C08K 3/20* (2013.01); *C08L 67/02* (2013.01); *C08K 3/10* (2013.01); *C08K 3/24* (2013.01); *C08L 77/00* (2013.01); *C08L 67/00* (2013.01); *C08L 77/06* (2013.01); *C08K 3/36* (2013.01)
USPC ....... 428/35.7; 428/34.1; 428/34.2; 428/35.9; 428/36.9

(58) Field of Classification Search
USPC ..................... 428/34.1, 34.2, 35.7, 35.9, 36.9
See application file for complete search history.

(56) References Cited

U.S. PATENT DOCUMENTS

| | | | | |
|---|---|---|---|---|
| 4,153,781 A | * | 5/1979 | Thillier et al. | ................ 528/274 |
| 4,501,781 A | | 2/1985 | Kushida et al. | |
| 5,453,260 A | * | 9/1995 | Nakazawa et al. | ......... 423/327.1 |
| 5,800,911 A | * | 9/1998 | Sankey et al. | ................ 428/213 |
| 2006/0199904 A1 | | 9/2006 | Hale et al. | |

FOREIGN PATENT DOCUMENTS

| | | | |
|---|---|---|---|
| EP | 0 301 719 A1 | | 2/1989 |
| EP | 0 507 207 A2 | | 10/1992 |
| WO | WO 03/064267 A2 | | 8/2003 |
| WO | WO-03064267 A2 | * | 8/2003 |
| WO | WO 2005/014410 A1 | | 2/2005 |
| WO | WO 2006/125549 A1 | | 11/2006 |
| WO | WO 2006/138636 A1 | | 12/2006 |

* cited by examiner

*Primary Examiner* — Marc Patterson
(74) *Attorney, Agent, or Firm* — Reinhart Boerner Van Deuren P.C.

(57) ABSTRACT

The polymeric material having oxygen barrier properties and low light transmission characteristics, in particular within the UV and visible light wavelengths and comprises (A) a polyester, (B) mineral particles, (C) a polyamide, and (D) at least one transition metal catalyst. Preferably the amount of mineral particles is not more than 26 wt % of the total weight of the material, and is not less than 20 wt % of the total weight of the material.

35 Claims, 12 Drawing Sheets

Figure 1:
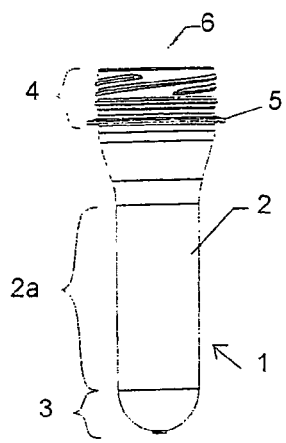

POLYMERIC MATERIAL FOR MAKING A PACKAGING ARTICLE HAVING OXYGEN-BARRIER PROPERTIES AND LOW LIGHT TRANSMISSION PROPERTIES

FIELD OF THE INVENTION

The present invention relates to the field of plastic packaging, and more especially to the field of plastic packaging for storing oxygen-sensitive and light sensitive products, such as for example dairy products or nutritional products. A main object of the invention is a new polymeric material for making a packaging article exhibiting both oxygen barrier properties and high opacity.

PRIOR ART

Aromatic polyester resins, and in particular polyethylene terephthalate (PET), are widely used in the packaging industry for making various packaging articles. The wording "packaging article" used therein refers to any article that is used for storing any product or material, and especially (but not only) food or beverages. For example, a packaging article can be a hollow and rigid container, such as bottle, jar or the like, a flexible plastic container, a film or a sheet for a package.

PET is a polymer widely used for making transparent packaging articles. In particular PET is used in the packaging industry for making transparent biaxially stretched containers having good mechanical properties (top load, burst pressure) and good thermal performances. Packaging articles made of PET alone are however not suitable for storing products that are sensible to ultraviolet radiations and/or visible light radiations (i.e. that can be altered or degraded by light radiations and/or by light induced oxidation), such as for example dairy products in the food industry. Such light sensible products need to be stored in opaque packaging articles having a low transmission at wavelengths up to 800 nm, and more especially for light radiations between 400 nm and 800 nm.

PET also lacks sufficient gas barrier properties for many applications. In particular because of its oxygen permeability, PET alone is not appropriate for packaging for long shelf life oxygen-sensitive food and beverage products such as beer, fruit juices, some carbonated soft drinks, etc. . . . . PET is also permeable to carbon dioxide, which in turn leads to a short shelf life for carbonated products, such as carbonated soft drinks, stored in PET containers.

A first solution for making a low light transmission packaging articles consists in using an aromatic polyester composition, and for example a PET resin, mixed with a sufficient amount of opacifying agents such as for example titanium dioxide ($TiO_2$). The use of high amount of opacifying agents such as $TiO_2$ gives good result in terms of opacity, but is extremely costly because of the high price of $TiO_2$.

Another solution for making truly opaque packaging articles consists in making multilayered packaging articles including a black layer. This solution is efficient in terms of opacity to UV (wavelengths up to 400 nm) and visible light (wavelengths ranging from 400 nm to 700 nm) and is commonly used for example in the food industry for storing dairy products such as UHT milk. This solution is however more costly than a monolayer solution.

Another solution for making an aromatic polyester composition that can be used for making monolayer opaque packaging articles is disclosed in PCT application WO 2006/125549 to Amcor Limited. This polymeric composition comprises a polyester resin, and in particular a PET homo or copolymer, and micrometrical silica particles dispersed in the polyester resin. Such an aromatic polyester composition comprising micrometrical silica particles can be advantageously used for making packaging, and in particular injection stretched-blow moulded containers, exhibiting low light transmission properties at wavelengths up to 800 nm, and more especially for visible light radiations between 400 nm and 800 nm. The gas barrier properties of such packaging and more especially the $O_2$ barrier properties are however not sufficient for many applications wherein oxygen sensitive products need to be stored.

In order to improve the gas barrier properties of packaging articles, in particular oxygen and/or carbon dioxide barrier properties, it is now common to use multilayered packaging articles, and in particular multilayered containers, that include at least one barrier layer. For example, in the field of bottle packaging, a typical and common multilayered wall structure for a hollow rigid container is a three-layer wall: two internal and external layers made of PET, and one intermediate gas barrier layer sandwiched between the two PET layers.

A first known type of barrier layer is made of, or comprises, polymers that have excellent gas-barrier properties, and in particular that exhibit low permeability to $O_2$ and/or $CO_2$, and is generally referred as "passive barrier layer". Among the polymers used for making passive barrier layers, homo- or copolymers of polyamides are commonly used. Among these polyamides, the so-called "MXD6" or "MXD6 nylon" (specific polyamide material manufactured by Mitsubishi Gas Chemical Company, Japan) is preferably used, i.e. a poly(m-xylyleneadipamide) produced by the polycondensation of a diamine component composed mainly of m-xylylenediamine and a dicarboxylic acid component composed mainly of adipic acid.

U.S. Pat. No. 4,501,781 assigned to Yoshino Kogyosho Co, Ltd discloses a multilayered container having for example a three layer structure: an internal layer and an external layer made of PET; an intermediate passive barrier layer that is made of a blend PET and a xylylene group-containing polyamide (preferably MXD6). The ratio of the xylylene group-containing polyamide in the blend is in the range 5 wt % to 50 wt %, and preferably in the range 10 wt % to 30 wt %.

A second known type of barrier layer, which has been more recently developed, is made of, or comprises, polymeric composition that has oxygen-scavenging properties, and is generally referred as "active barrier layer". Generally speaking, an active barrier layer reacts with the oxygen and "captures" the oxygen when the oxygen penetrates into the layer. Such active barrier layer is thus progressively "consumed" in use.

Examples of polymeric compositions used for making active barrier layer are described notably in European patent application EP-A-0 301 719 or in European patent application EP-A-0 507 207. Said polymeric compositions generally comprise an oxidizable polymer and a transition metal catalyst. In EP-A-0 301 719, the preferred oxidizable polymers are polyamides, and especially MXD6. In EP-0 507 207, one preferred oxidizable polymer is polybutadiene. In both cases, preferred transition metal catalysts are transition metal salts, an in particular cobalt stearate. Other known metal salts used for making such composition are rhodium, manganese, copper, iron.

PCT application WO 2005/014410 to Amcor Limited also discloses a polymeric material for making a packaging article having a wall with both oxygen-scavenging properties and low haze, said material comprising a polyamide, a transition metal catalyst, and a copolymer of polyethylene terephthalate and polyethylene isophthalate, having an isophthalic purified acid (IPA) content of at least 5 mole % and/or a copolymer of polyethylene terephthalate and 1,4 cyclohexane dimethanol (CHDM) having a CHDM content of at least 5 mole %.

With multilayered packaging articles having at least one gas barrier layer comprising a polyamide (e.g. MXD6) and a polyester (e.g. PET), very good results can be achieved in terms of shelf life of the packaged products. More especially when the barrier layer comprises a polyamide (e.g. MXD6), polyester (e.g. PET), and a catalyst such as a cobalt salt, the multilayered packaging article can be used for storing oxygen-sensitive products, such as beer, fruit juice, or the like. The shelf life of the packaged product widely depends of the amount of polyamide in the packaging article and of the thickness of the barrier layer.

In return, these polymeric material of the prior art that comprise a polyamide (e.g. MXD6), a polyester (e.g. PET, PETG, . . . ), and a catalyst such as a cobalt salt are not suitable for making packaging for storing light-sensitive products, especially product that is sensible to UV radiations and/or visible light radiations.

OBJECTIVE OF THE INVENTION

A general and main objective of the invention is to propose a new polymeric material that can be used for making a packaging article exhibiting both oxygen-barrier properties and low light transmission properties.

Preferably, this new polymeric material is also suitable to be processed by ISBM (Injection Stretch Blow Moulding) technologies.

SUMMARY OF THE INVENTION

A first object of the invention is thus a polymeric material having oxygen barrier properties and low light transmission characteristics, said material comprising (A) a polyester, (B) mineral particles, (C) a polyamide, and (D) at least one transition metal catalyst.

The terms "mineral particles" used therein mean any inert mineral particles. The mineral particles can be for example selected from the group: silica, calcite, barite, talc, dolomite, montmorillonite, clay or combination thereof.

The preferred mineral particles for practising the invention are however silica particles. The terms "silica particles" used therein mean any particle having a silica content of at least 50 wt %.

For carrying the invention, any silica particles having at least 50 wt % of $SiO_2$ can be used. Among the preferred silica particles, one can use cristobalite or quartz.

Preferably, high purity silica particles will be used, in particular silica particles comprising at least 90 wt % of $SiO_2$, more preferably at least 95 wt % of $SiO_2$, and even more preferably at least 99 wt % of $SiO_2$.

Preferably the silica particles are micrometrical particle. The terms "micrometrical particles" used therein mean particles having a particle size of at least 1 μm.

The terms "particle size" used therein mean the diameter of the particles measured by any standard laser diffraction method and for example the standard Malvern laser diffraction method. The laser diffraction method is well known in the prior art and is commonly used for measuring the size distribution of particles. It has to be reminded that with a laser diffraction method such as the Malvern diffraction method, the volume of the particles is actually measured, and the particle diameters are calculated from the measured volume of the particles, but with the assumption that the particles are spherical. Consequently, the diameter of the particle is calculated from a sphere equivalent volume equal to the measured volume of the particle.

Preferably, the inert mineral particles are micrometrical particles have a size between 1 μm and 20 μm, and/or an average size of 3 μm.

Within the scope of the invention, the "polyester" may be constituted of a single polymer (the polyester), or of a copolyester, or of a polymer blend wherein at least one component is a polyester or a copolyester. For example, other polymers, like PE, can be blended with the polyester.

Polyester resins that are suitable for carrying out the invention are those generally obtained through polycondensation of diols and dicarboxylic acids or esters thereof.

Among the diols suitable for carrying out the invention, one can mention: ethylene glycol, diethylene glycol, propylene glycol, 1,3-propanediol, 1,4-butanediol, 1,3-butanediol, 2,2-dimethylpropanediol, neopentyl glycol, 1,5-pentanediol, 1,2-hexanediol, 1,8-octanediol, 1,10-decanediol, 1,4-cyclohexanedimethanol, 1,5-cyclohexanedimethanol, 1,2-cyclohexanedimethanol, or mixtures thereof.

Among the dicarboxylic acids suitable for carrying out the invention, one can mention: terephthalic acid, isophthalic acid, orthophthalic acid, 2,5-naphthalene dicarboxylic acid, 2,6-naphthalene dicarboxylic acid, 1,3-naphthalene dicarboxylic acid, 2,7-naphthalene dicarboxylic acid, methyl terephthalic acid, 4,4'-diphenyldicarboxylic acid, 2,2'-diphenyldicarboxylic acid, 4,4'-diphenylether dicarboxylic acid, 4,4'-diphenylmethanedicarboxylic acid, 4,4'-diphenylsulfonedicarboxylic acid, 4,4'-diphenylisopropylidene-dicarboxylic acid, sulfo-5-isophthalic acid, oxalic acid, succinic acid, adipic acid, sebacic acid, azelaic acid, dodecanedicarboxylic acid, dimer acid, maleic acid, fumaric acid, and all aliphatic diacids, cyclohexane dicarboxylic acid. The dicarboxylic acids can be introduced in the polycondensation medium in an esterified form, for example via methoxy or via ethoxy.

The preferred polyesters for carrying out the invention are polyethylene terephthalate (PET), homo or copolymers thereof, and mixtures thereof.

Typically, the amount of polyester (A) is preferably at least 50 wt % of the total weight of the material, and preferably at least 60 wt %. Lower amount of polyester can be however envisaged for practising the invention.

Polyamides that are suitable for making the composition of the invention can be any homo- or copolymer of polyamide (aromatic or aliphatic polyamide). Particularly interesting polyamides are those containing groups of the formula -arylene-$CH_2$—NH—CO—, conveniently in —NH—$CH_2$-arylene-$CH_2$—NH—CO-alkylene-CO— units. Especially suitable arylene groups are phenylene groups, particularly m-phenylene groups, which may be alkyl-substituted and/or condensed with other unsubstituted or alkyl-substituted aromatic rings. Alkylene and alkyl groups may conveniently have from 1 to 10 carbon atoms, and may be straight-chain or branched. Especially suitable alkylene groups are n-butylene groups. More particularly, among the polyamides that can be used for making the gas barrier of the preform or container of the invention, the so-called MXD6 is the most suitable owing to the high gas barrier properties of this polyamide.

Fully aliphatic polyamides can also be used, especially those comprising —$CO(CH_2)_nCONH(CH_2)_mNH$— or —$(CH_2)_pCONH$— units (n, m, and p being integers usually equal to 4, 5 or 6).

In a preferred variant, in order to obtain sufficiently high $O_2$ barrier properties, the amount of polyamide (C) is preferably not less than 2 wt %, and even more preferably not less than 5 wt % of the total weight of the material.

For practising the invention the transition metal catalyst can be selected from the group: cobalt compound, rhodium compound, copper compound, iron compound.

The preferred candidate is however cobalt salt, and more preferably cobalt stearate.

The amount of transition metal catalyst will be sufficient to confer oxygen-scavenging properties to the polymeric material.

The inventors have also discovered that the amount of mineral particles had a strong impact, not only on the light transmission properties, but also and surprisingly on the $O_2$ barrier properties. In particular, higher amount of mineral particles increases the permeability to oxygen.

In a preferred variant of the invention, and in order to achieve good $O_2$ barrier properties, the amount of mineral particles in the polymeric material is thus preferably not more than 26 wt % of the total weight of the material, and even more preferably less than 25 wt %.

Besides, in order to obtain high opacity in the UV and visible wavelengths range, in a preferred variant of the invention, the amount of mineral particles is preferably not less than 20 wt % of the total weight of the material, and even more preferably not less than 22 wt %.

In some variants of the invention, the material can further comprise low amount of dyeing agent selected to block radiations of predefined wavelengths. In particular low amount $TiO_2$, as dyeing agent, can be used, in order to obtain high opacity to UV radiations and visible light, even when the polymeric material comprises low amount of mineral particles. In a preferred variant of the invention, the amount of $TiO_2$ is preferably higher than 3 wt % and not more than 5 wt % of the total weight of the material. $TiO_2$ is not the sole dyeing (or opacifying) agent that can be used within the scope of the invention. More generally, the dyeing agent can be selected from the group: $TiO_2$, colorants (blue, green, amber, . . . ), carbon black.

It will be readily apparent to one skilled in the art, that the polymeric material of the invention can further comprise other additives such as for example, lubricants for improving the processability of the material, or compatibilizers for improving the mixing of the polyamide and polyester in the melt phase, UV stabilizers, . . . .

Other additional and optional technical characteristics for the polymeric material of the invention are mentioned in the claims.

A further object of the invention is packaging article made from the aforesaid polymeric material. The wording "packaging article" used therein means any article that is used for storing any product or material, and especially (but not only) food or beverages.

The packaging article is more preferably selected from the group: preform, rigid container, flexible container, film, sheet.

The packaging article can be advantageously a monolayer article. Within the scope of the invention, multilayer packaging articles can however also be envisaged, at least one of the layer being in that case made from the polymeric material of the invention.

In a preferred embodiment, the packaging article is a biaxially stretched container, and more particularly is an injection stretch blow moulded container.

When the packaging article comprises a stretched wall, the stretch ratio of this wall can have a strong impact on the $O_2$ barrier properties of the wall. More particular, the inventors discovered that higher stretch ratios increase the permeability to oxygen of the material.

In a preferred variant of the invention, the packaging article comprises a stretched wall and the stretching of the wall is sufficiently low in order to have a light transmission through the wall that is less than 1% at 550 nm and less than 2.5% at 800 nm.

In a preferred embodiment, the packaging article will be characterised by an $O_2$ dissolved ingress that is less than 1 ppm, and even more preferably less than 0.5 ppm, after a storage period of at least 180 days. As previously outlined, the amount of mineral particles has surprisingly a strong impact on the $O_2$ barrier properties. In particular, higher amount of mineral particles increases the permeability to oxygen. To make a packaging article characterised by an $O_2$ dissolved ingress that is less than 1 ppm, and even more preferably less than 0.5 ppm, after a storage period of at least 180 days, the amount of mineral particles has to be adjusted, and in particular has to be sufficiently low in order to avoid a prejudicial deterioration of the $O_2$ barrier properties of the packaging wall.

The invention finally relates the use of the aforesaid packaging article of the invention for storing a product that is sensible to UV radiations and/or visible light radiations.

SHORT DESCRIPTION OF THE DRAWINGS

Figure 2:
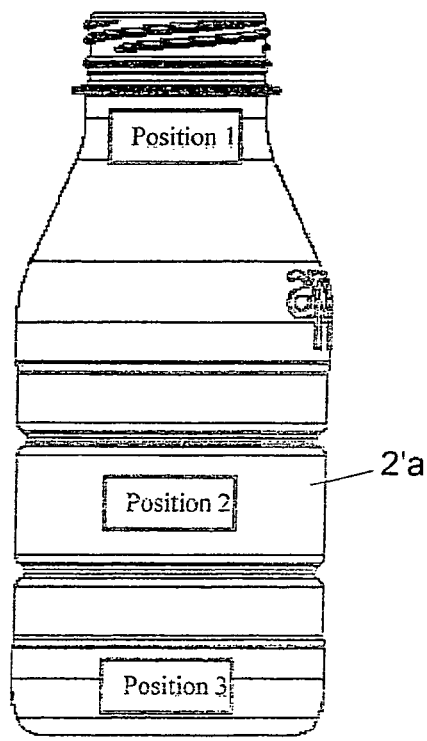
Figure 12:
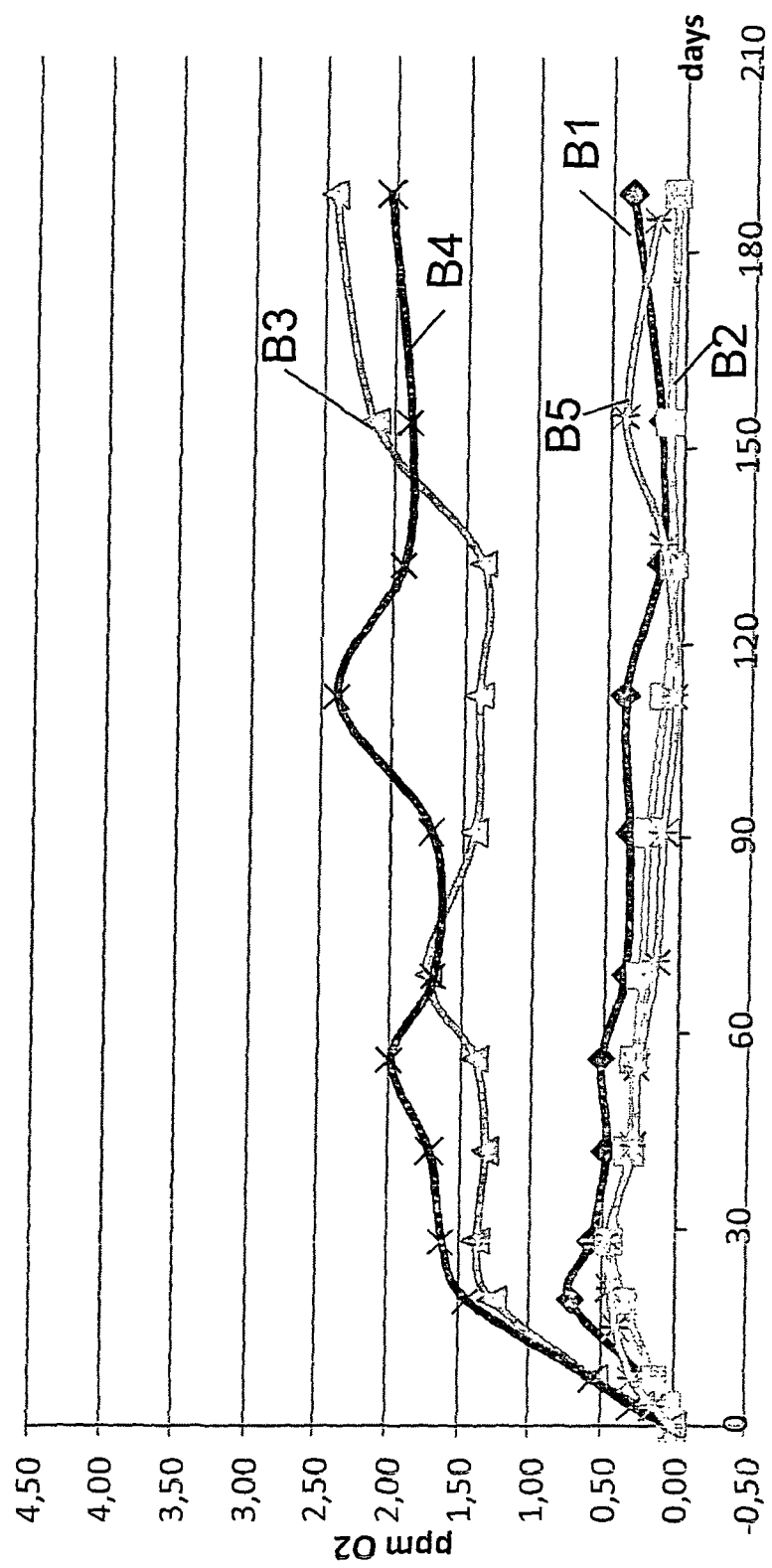
Figure 13:
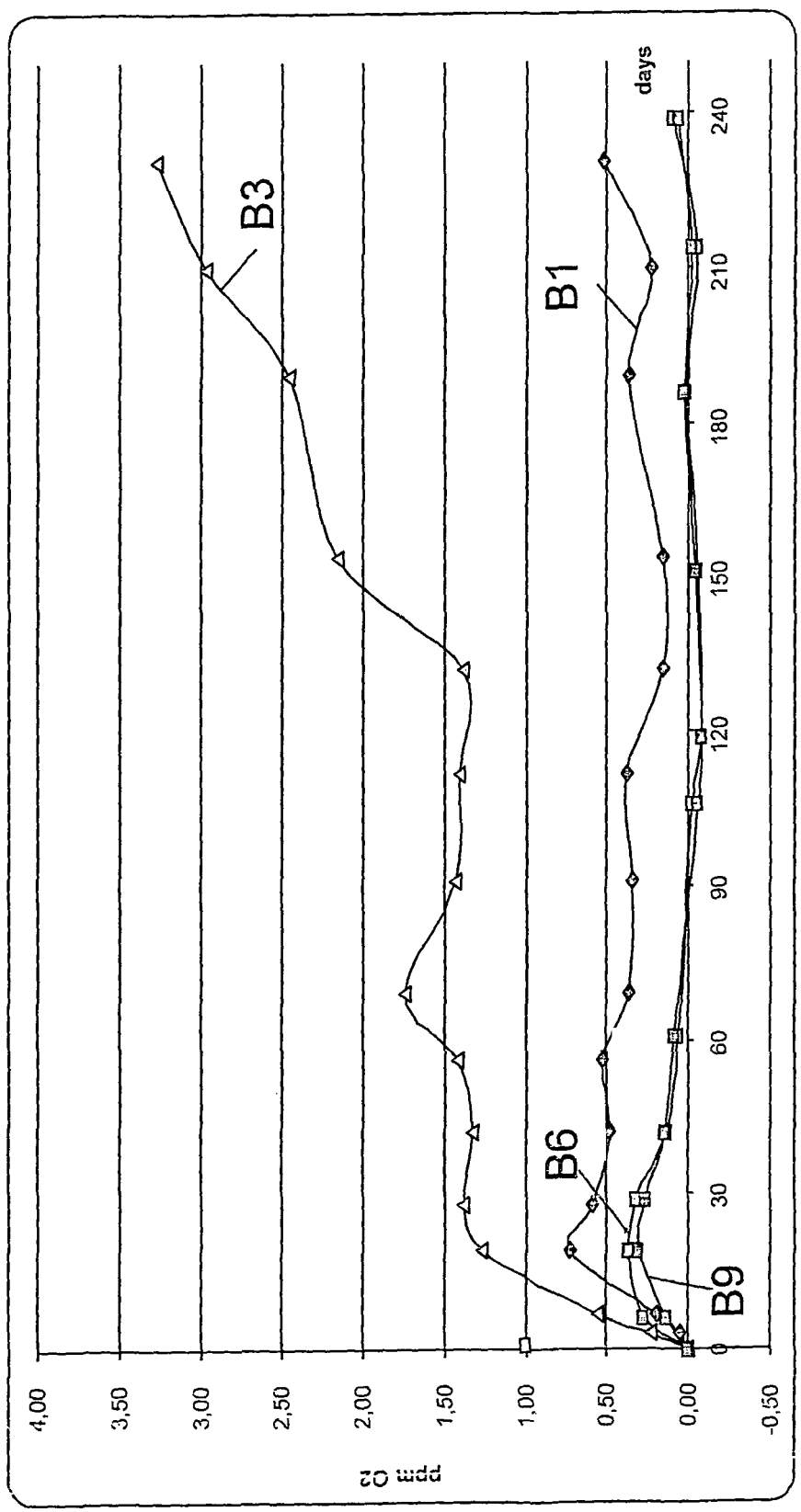

Other characteristics and advantages of the invention will appear more clearly on reading the following detailed description which is made by way of non-exhaustive and non-limiting example, and with reference to the accompanying drawings, in which:

FIG. 1 is schematic drawing of a monolayer preform,

FIG. 2 is a schematic drawing of a monolayer bottle obtained by stretch blow moulding the preform of FIG. 1, FIGS. 3 to 11 show the light transmission spectra of different monolayer bottles (B1 to B9) between 250 nm and 800 nm, FIG. 12 is a graph with $O_2$ dissolved ingress curves ("Orbisphere test") for different monolayer bottles B1 to B5, FIG. 13 is a graph with $O_2$ dissolved ingress curves ("Orbisphere test") for different monolayer bottles B1, B3, B6, and B9.

DETAILED DESCRIPTION OF THE INVENTION

The following detailed description is focused on the manufacturing of several examples of biaxially stretched containers by using the well-know injection stretch blow moulding technique. Nevertheless, it must be underlined that the scope of the invention is not limited to this particular type of packaging article, but can be extended to any packaging article. For example, one can also practise the invention for making a packaging article (flexible or rigid) by using the extrusion blow moulding or thermoforming techniques. One can also use the invention for making flexible films or sheets. The packaging article of the invention can have a monolayer structure or multilayer structure.

EXPERIMENTAL RESULTS

Preparation of the Polymeric Material

Different polymeric materials have been prepared and processed by using the well-known injection blow moulding technique in order to make monolayer biaxially stretched bottles.

All these polymeric materials have been obtained by dry blending three different batches (a), (b) and (c) of materials.

Batch (a)

A polyester/silica/$TiO_2$ compound is prepared in a compounding step.

This compound is made with 46.1 wt % of PET pellets (A1), 46.1 wt % of micrometrical silica particles (B), and 7.8 wt % of $TiO_2$ (E). More particularly PET pellets (A1) are those commercialized under reference "9921 P" by company named VORIDIAN.

The silica particles (B) are made of cristobalite. Cristobalite is high purity silica having a narrow particle size distribution.

In particular, the cristobalite particles (B) are for example those commercialized under reference Sibelite® M 6000 by company named SIBELCO. The composition of Sibelite® M 6000 particles is given in table 1.

TABLE 1

| Sibelite ® M 6000 composition | |
|---|---|
| $SiO_2$ | 99.5% |
| $Fe_2O_3$ | 0.03% |
| $Al_2O_3$ | 0.20% |
| $TiO_2$ | 0.02% |
| $K_2O$ | 0.05% |
| CaO | 0.01% |

The Sibelite® M6000 particles are substantially spherical and have a density around 2.35 Kg/dm³. The main granulometric data of Sibelite® M 6000 particles are given in table 2.

TABLE 2

| Particle size distribution - Sibelite ® M 6000 | |
|---|---|
| Particle Sizes (μm) | Size distribution |
| >20 | None |
| >15 | 1% |
| >10 | 3% |
| >5 | 24% |
| >2 | 67% |
| >1 | 89% |

The particle sizes of table 2 were measured by using the standard Malvern laser diffraction method carried out with an analyzer "MASTERSIZER S" from GOFFYN MEYVIS. In table 2, the size distribution (second column) is expressed in volume percentage.

Referring to table 2, 89% of the Sibelite® M 6000 particles have a size greater than 1 μm; 67% of the Sibelite® M 6000 particles have a size greater than 2 μm, 24% of the Sibelite® M 6000 particles have a size greater than 5 μm, 3% of the Sibelite® M 6000 particles have a size greater than 10 μm; 1% of the Sibelite® M 6000 particles have a size greater than 15 μm.

Furthermore, the average particle size of the Sibelite® M 6000 is around 3 μm.

The compounding step for making the compound (A1/B/E) of batch (a) is performed as follows with a co-extruder.

PET (A1) is first dried at 160° C. during 6 hours under dried air having a dew point of −60° C. The residual moisture content is approximately 42 ppm.

46.1 weight % of dried PET (A1) is gravimetrically dosed at the throat of a co-extruder. The co-extruder is a Berstorff Compex low-shear co-rotating twin-screw extruder.

The cristobalite (B) (46.1 wt % of total weight) and $TiO_2$ (E) (7.8 wt % of total weight) is added in the molten PET material (A1) in the co-extruder via a side feeder.

The temperature of the extruder zones are given in table 3:

TABLE 3

| | Extruder-temperature profile | | | | | | | | | | | |
|---|---|---|---|---|---|---|---|---|---|---|---|---|
| | Zones | | | | | | | | | | | |
| | Z1 | Z2 | Z3 | Z4 | Z5 | Z6 | Z7 | Z8 | Z9 | Z10 | Z11 | Z12 |
| Temperature (° C.) | 80 | 300 | 300 | 290 | 280 | 270 | 260 | 250 | 250 | 250 | 250 | 260 |

The side feeder (for adding the cristobalite and TiO₂ in the extruder) is connected to the fifth extruder zone (Z5). The rotational speed of the extruder screw is settled to 180 rpm, and the material output is approximately 350 kg/hours In the compound (A1/B/E), the inert cristobalite micrometrical particles are thus dispersed in the polyester matrix formed by the polyester resin.

The compounding step is thus performed in order to obtain a compound (A1/B:E) made of: (A1) 46.1 wt % of PET, (B) 46.1 wt % of silica particles, and (E) 7.8 wt % of TiO₂.

The molten compound is extruded into strings and cooled down in cold water bath (50° C.). Then pellets are cut by using a Rieter cutter. Pellets dimension is adjusted to be similar to the pellets dimension of batch (b).

Batch (b)

Batch (b) is made of virgin PET pellets (A2) of standard grade commercialized by VORIDIAN under reference "9921 W". The pellets main dimension is between 2 mm and 10 mm.

Batch (c)

Batch (c) is made of polyamide pellets (C) that are coated with a transition metal catalyst (D). The polyamide pellets (C) are pellets of average particle size between 2 mm and 10 mm, and are made of MDX6, grade 6007, commercialized by Mitsubishi Gas Chemical. The transition metal catalyst (D) is constituted by Cobalt Stearate commercialized by SHEPHERD under commercial reference "STECO 090HV".

In batch (c), the amount of polyamide pellets (C) is 98.5 wt % and the amount of transition metal catalyst (D) is 1.5 wt %.

Preparation of Dry Blends N°1 to 4

Aforesaid batches (a), (b) and (c) of pellets are separately stored in different drying equipments and are separately fed to a mixing device by using dosing equipments. The mixing device comprises internal rotating paddles, and is used for dry blending the batches (a), (b) and (c) of pellets at room temperature.

Different dry blends N°1 to N°4, that are characterised by different weight ratios of batches (a), (b) and (c) have been prepared and are summarized in table 4.

TABLE 4

Dry blends N° 1 to N° 4

| N° | Batch (a) (a)/[(a) + (b) + (c)] wt % | Batch (b) (b)/[(a) + (b) + (c)] wt % | Batch (c) (c)/[(a) + (b) + (c)] wt % | (A1 + A2) PET wt % | (B) Silica wt % | (C) MXD6 wt % | (D) CoSt wt % | (E) TiO₂ wt % |
|---|---|---|---|---|---|---|---|---|
| 1 | 39 | 55 | 6 | 72.979 | 17.979 | 5.91 | 0.09 | 3.042 |
| 2 | 41 | 53 | 6 | 71.901 | 18.901 | 5.91 | 0.09 | 3.198 |
| 3 | 44 | 50 | 6 | 70.284 | 20.284 | 5.91 | 0.09 | 3.432 |
| 4 | 47 | 47 | 6 | 68.667 | 21.667 | 5.91 | 0.09 | 3.666 |

Batch (a): 46.1 wt % of PET (A1) + 46.1 wt % of silica particles(B) + 7.8 wt % of TiO₂ (E)
Batch (b): 100 wt % of PET (A2)
Batch (c): 98.5 wt % of MXD6 (C) + 1.5 wt % of CoSt (D)

These blend N°1 to N°4 were air dried during 6 hours at 160° C. (dew point of −51° C.) before melt processing.

Bottles Manufacturing

Different examples of monolayer bottles have been manufactured from the dry blends N°1 to N°4. The main technical characteristics of these examples are summarized in table 5 (Bottles B1 to B9).

TABLE 5

Monolayer bottles B1 to B9

| | Bottle ref. | | | | | | | | |
|---|---|---|---|---|---|---|---|---|---|
| | B1 | B2 | B3 | B4 | B5 | B6 | B7 | B8 | B9 |
| Preform ref. | 427A | 427B | 427C | 427D | 427G' | 088D | 088E | 088F | 088G |
| Preform weight (g) | 17.5 | 19 | 17.5 | 19 | 13.5 | 17.5 | 17.5 | 17.5 | 17.5 |
| Bottle volume (ml) | 250 | 250 | 330 | 330 | 220 | 330 | 330 | 330 | 250 |
| Axial Stretch Ratio (ASR) | 2.11 | 2.07 | 2.64 | 2.60 | 2.37 | 2.64 | 2.64 | 2.64 | 2.11 |
| Radial Stretch Ratio (RSR) | 3.45 | 3.25 | 3.74 | 3.52 | 3.60 | 3.74 | 3.74 | 3.74 | 3.45 |
| Total Stretch Ratio (TSR) | 7.29 | 6.74 | 9.90 | 9.15 | 8.56 | 9.90 | 9.90 | 9.90 | 7.29 |
| Resin composition | N° 4 | N° 4 | N° 4 | N° 4 | N° 4 | N° 3 | N° 2 | N° 1 | N° 3 |

Injection Step

In a first step, and for every bottle example, a dry blend corresponding to one of the compositions N°1 to N°4 (see table 5) was injected in moulds, in order to form monolayer preforms in a standard way (injection moulding step). This injection step of the preforms was performed on a Husky LX 160 injection machine having a two cavities injection mould. Referring to FIG. 1, said preforms 1 have the well-known general following structure:
- a main tubular body 2 comprising a main substantial cylindrical wall 2a and closed by a substantially hemispherical bottom end 3;
- a neck portion 4 including a collar 5, and an opened end-mouth 6.

Stretch-Blow Moulding Step

In a second step, the preforms were reheated by infrared radiations in a standard way and were biaxially stretched and blow-moulded on a Sidel stretch blow moulding machine (SBO2/3®), in order to make stretched and blow moulded monolayer bottles of different volumes (Table 5), like the one shown on FIG. 2.

In table 5, for bottles B1 to B5, the values of axial stretch ratio (ASR), radial stretch ratio (RSR) and total stretch ratio (TSR) are given.

ASR (axial stretch ratio) is defined in a standard way by formula:

$$ASR = \frac{L}{l}$$

wherein: (L) is the bottle developed length and (l) is the preform neutral fibre developed length.

RSR (radial stretch ratio) is defined in a standard way by formula:

$$RSR = \frac{D}{d}$$

wherein (D) is the maximum bottle outside diameter and (d) is the preform neutral fibre diameter.

TSR (total stretch ratio) is defined in a standard way by formula:

TSR=ASR×RSR

The settings of the Sidel machine were the same for all bottles and are summarized in table 6.

TABLE 6

| Blowing machine settings | |
|---|---|
| General heating power | 79% |
| Zone 1 | 80% |
| Zone 2 | 65% |
| Zone 3 | 25% |
| Zone 4 | 10% |
| Zone 5 | 10% |
| Zone 6 | 65% |
| Zone 7 | 30% |
| Output | 1100 bottle/mould · hour |
| Preblow pressure | 10 bars |
| Blow pressure | 38 bars |

TABLE 6-continued

| Blowing machine settings | |
|---|---|
| Blow mould temperature | 10° C. |
| Stretch rod diameter | 14 mm |

It has to be outlined that a two-stage injection stretch blow moulding technique was used for manufacturing all the bottles. According to this technique, the preforms are reheated for example by infrared radiations before their introduction in the blow mould. In other variants of the invention, one skilled in the art can also use a one-stage injection stretch blow moulding technique (i.e. without a reheating step of the preforms prior to the blowing step).

Tests on Bottles

Several tests have been performed on the bottles in order to measure:
- the residual ash content
- the light transmission spectra between 250 nm and 800 nm
- the oxygen barrier properties.

Residual Ash Content

The bottles were burnt at 700° C. and the residual ash content weight after calcination was measured. This ash content after calcination at 700° c. characterises the real weight percentage of silica (on the total weight of the bottle). The results of this test for each bottle B1 to B9 are summarized in table 7.

TABLE 7

| | Ash content | | | | | | | | |
|---|---|---|---|---|---|---|---|---|---|
| | Bottle ref. | | | | | | | | |
| | B1 | B2 | B3 | B4 | B5 | B6 | B7 | B8 | B9 |
| Preform ref. | 427A | 427B | 427C | 427D | 427G' | 088D | 088E | 088F | 088G |
| Composition N° | 4 | 4 | 4 | 4 | 4 | 3 | 2 | 1 | 3 |
| ash content (wt %) | 25.5 | 25.7 | | 25.7 | 25.3 | 24.1 | 22 | 20.7 | |

Wall Thickness (WTb) and Light Transmission

For the light transmission measurements, a small square-shaped sample (approximately 1.5 cm×1.5 cm) was cut into the stretched wall (2'a) of the bottle at three different positions referred "position 1", "position 2" and 'position 3" on FIG. 2. The wall thickness (WTb) of the sample was measured with a magnamike thickness measuring device CTR008 equipped with probe CTR0133 and the light transmission spectra within the wavelength range 250 nm to 800 nm were measured with the following equipment:

Double beam spectrophotometer Shimadzu UV-2401PC (CTR0212)

Integrating sphere assembly ISR-240A (Integrating sphere: Internal diameter of 60 mm with $BaSO_4$ coating—Detector: Photomultiplier R-446U).

Figure 3:
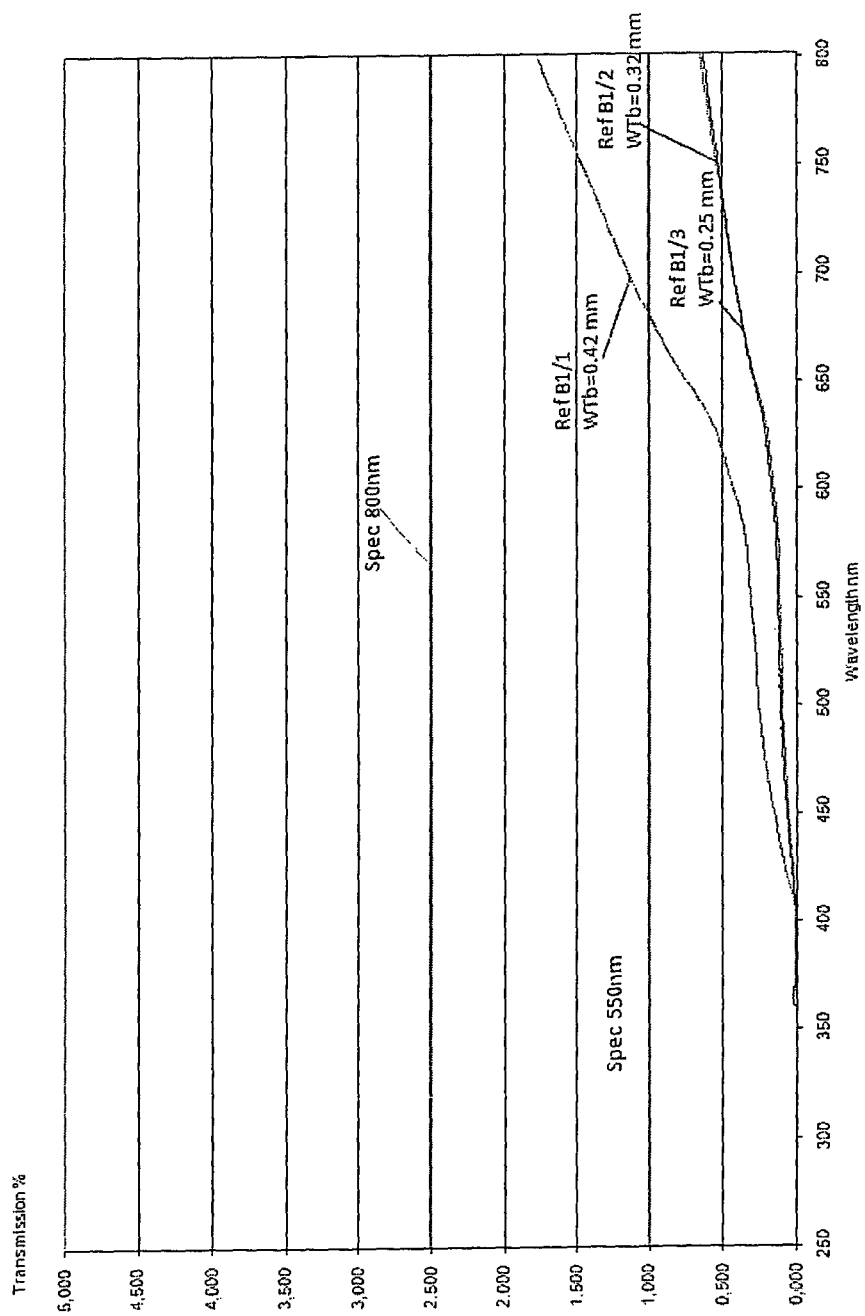
Figure 4:
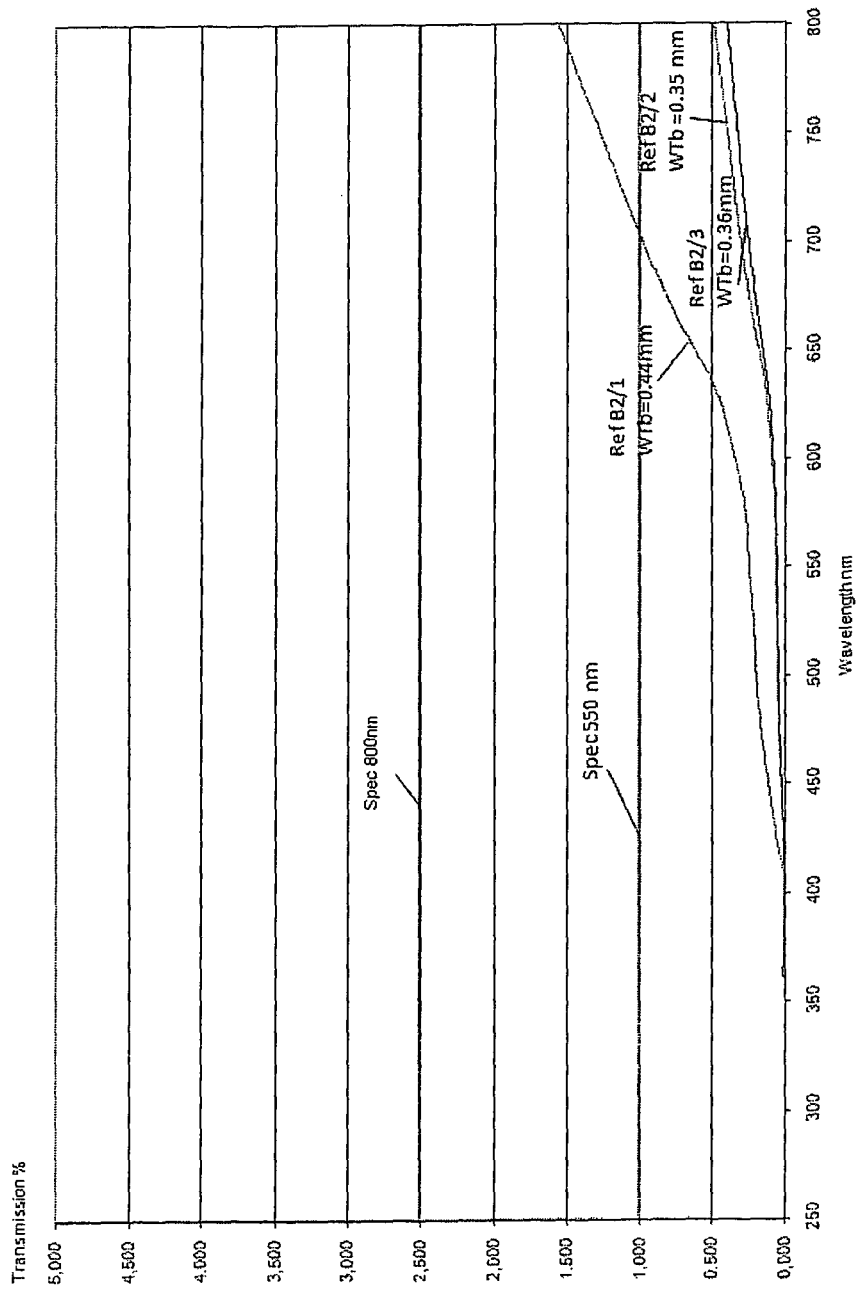
Figure 5:
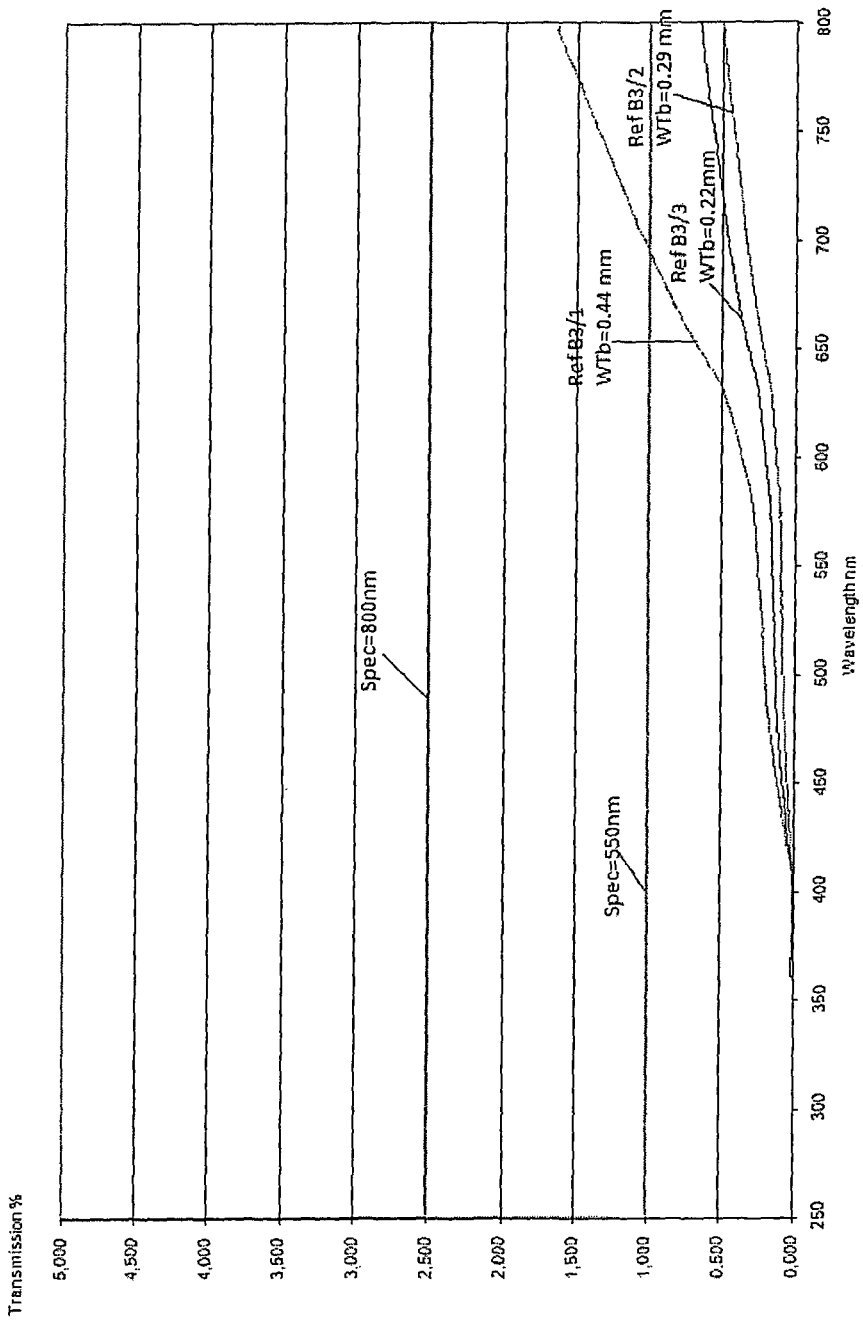
Figure 6:
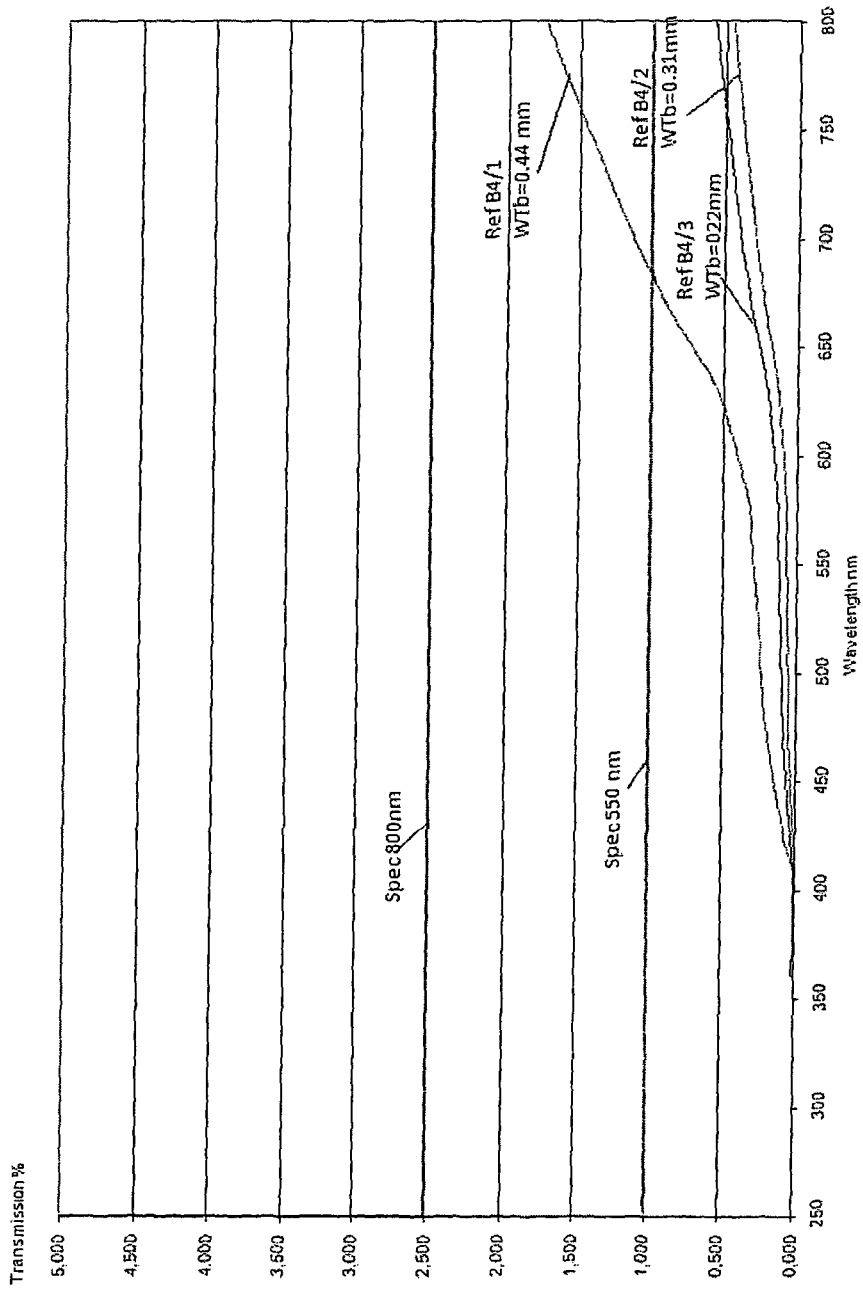
Figure 7:
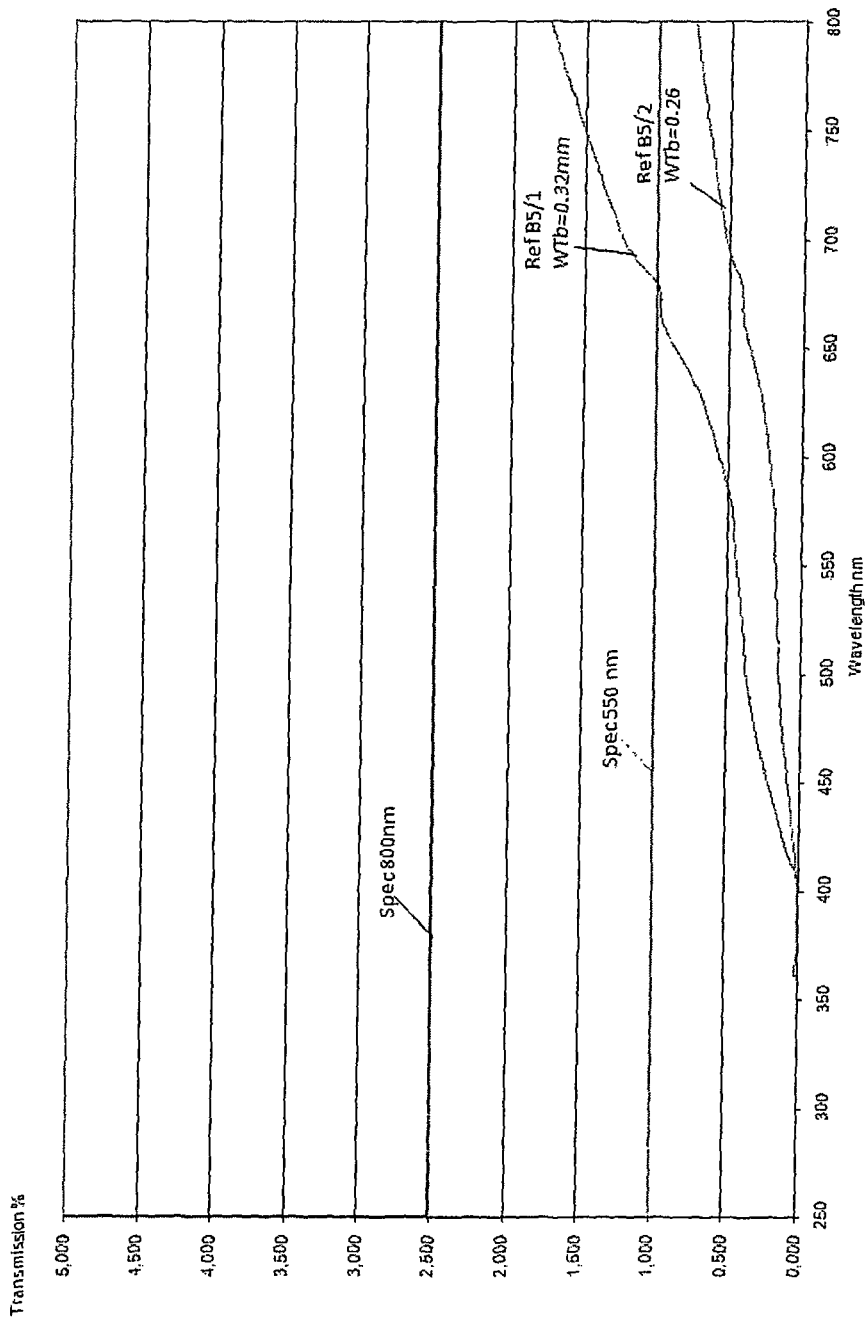
Figure 8:
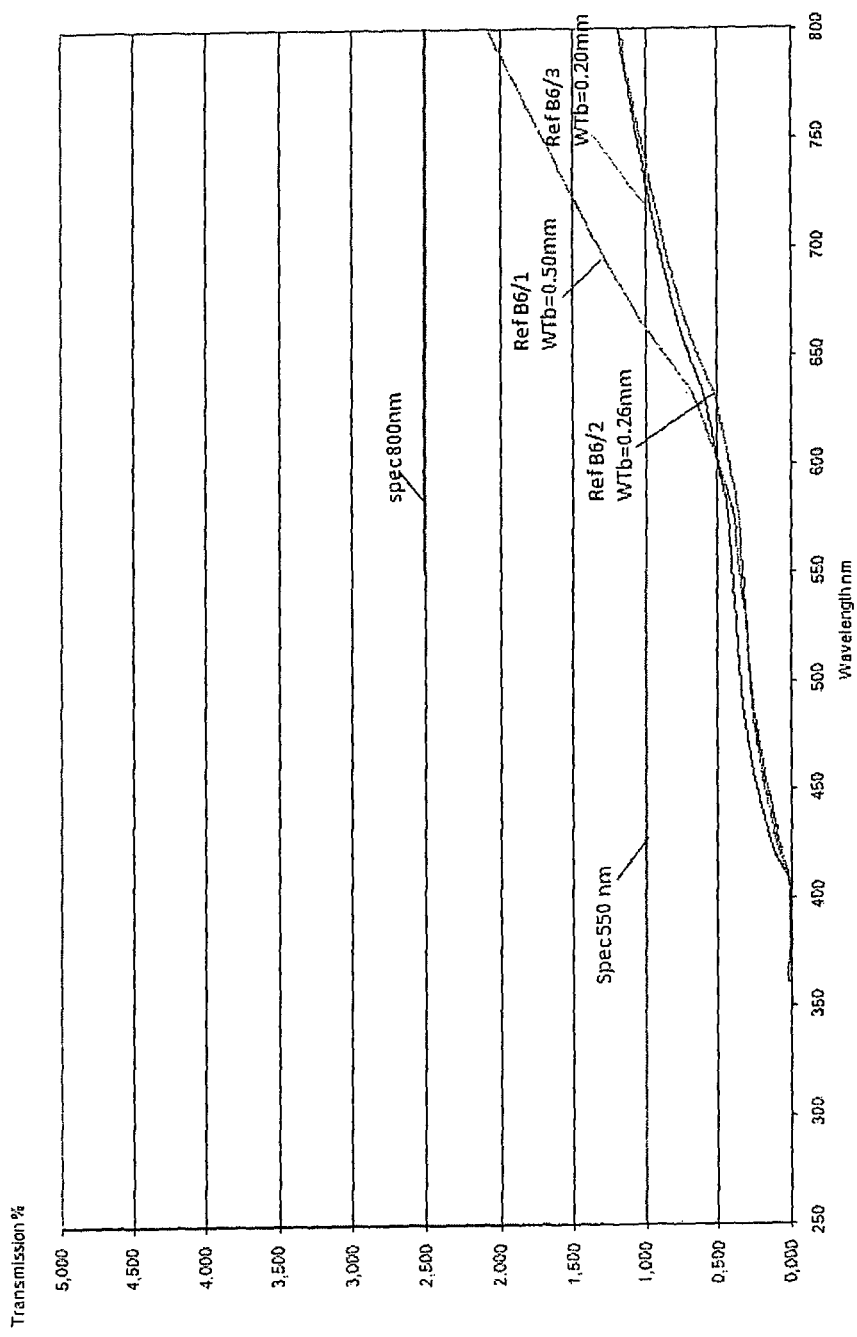

The light transmission spectra for each bottle B1 to B9 are shown on FIGS. 3 to 11. Referring for example to FIG. 3, the horizontal straight lines referenced "Spec 800 nm" and "Spec 550 nm" define preferred maximum values for the light transmission respectively at 800 nm and 550 nm; the curve referenced B1/1 is the light transmission spectrum of bottle B1 measured at "position 1"; the curve referenced B1/2 is the light transmission spectrum of bottle B1 measured at "position 2"; the curve referenced B1/3 is the light transmission spectrum of bottle B1 measured at "position 3". The same type of references has been used for the curves of FIGS. 4 to 11.

Oxygen Barrier Properties

The oxygen barrier properties, and more especially the oxygen-scavenging properties, of bottles B1 to B6, and B9 have been measured according to a test method called "Orbisphere test". The results are shown on the graphs of FIGS. 12 and 13.

"Orbisphere Test"

Bottles are filled brimful with deaerated water-less than 150 ppb of $O_2$— and are closed with an induction sealed aluminium foil. Then they are stored at constant temperature of 22° C.+/−0.5° C. The $O_2$ dissolved in water is measured every 2 weeks using the orbisphere method. The general principle of the orbisphere system is based on the law of equilibrium between the gas present in the liquid and the gas phase. The equipment used is an oxygen sensor serie 311 XX with a membrane model 2958 A. The orbisphere microprocessor for $O_2$ measurement is the 2640 model.

Bottles are first shaken during 3 minutes then the liner is pierced by the needle of the orbisphere piercer; the water to analyse is pushed by an inert gas-nitrogen-towards the oxygen sensor containing the membrane. $O_2$ concentration is then automatically calculated and displayed on the screen.

The quantity of $O_2$ dissolved inside the different bottles is measured, with a predetermined frequency (for example every two weeks), in order to follow the evolution of $O_2$ dissolved.

Results—FIGS. 3 to 13

Light Transmission—FIGS. 3 to 11

The light transmission spectra of FIGS. 3 to 7 show that bottles B1 to B5 that are made from the same composition N°4 exhibit very low light transmission properties up to 800 nm. In particular, the light transmission is less than 1% at 550 nm and less than 2.5% at 800 nm, and these bottles can thus be used for storing products that are sensitive to UV radiations and visible light radiations up to 800 nm, such as for example dairy product (milk, . . . ), baby food, soy based sauces, nutritional or medicinal products.

Figure 9:
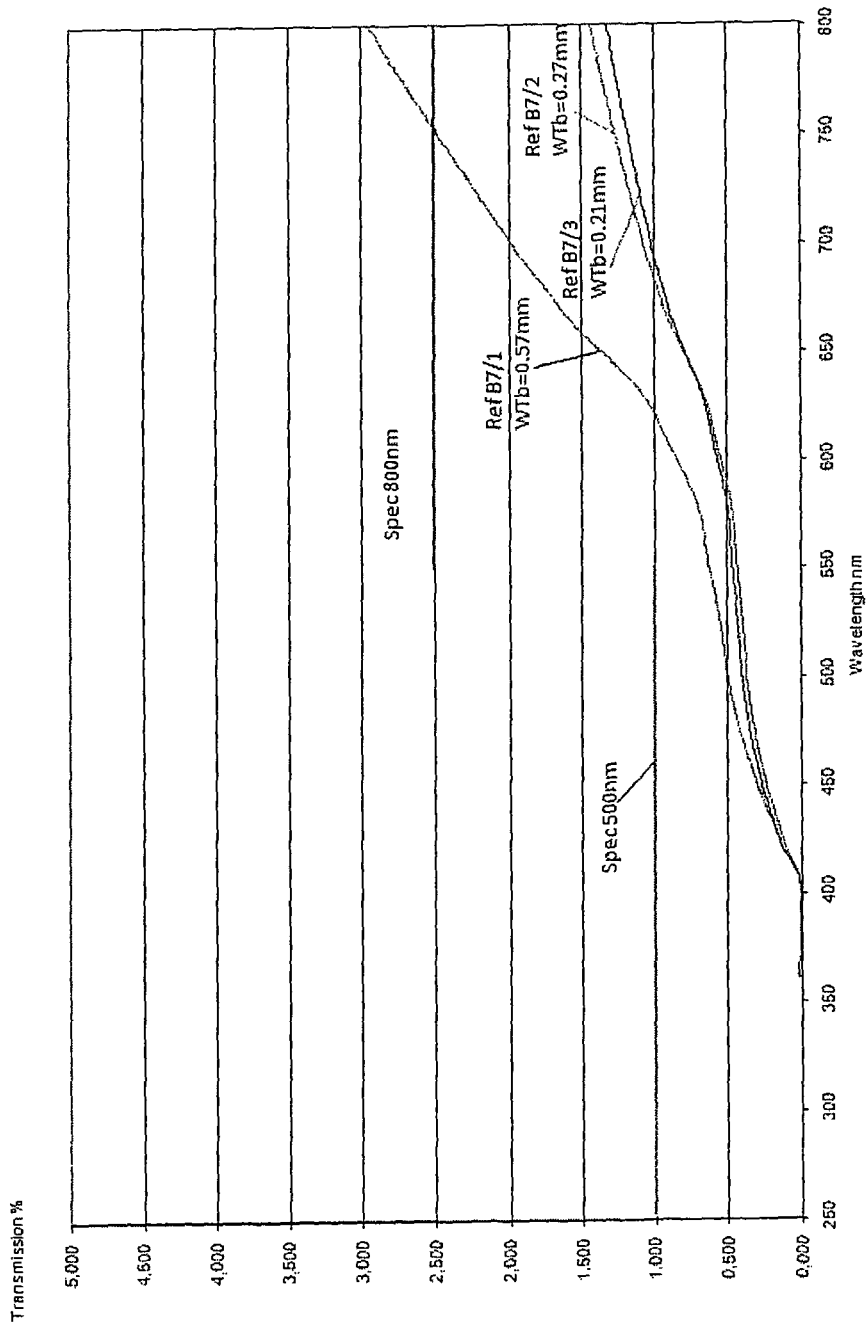
Figure 10:
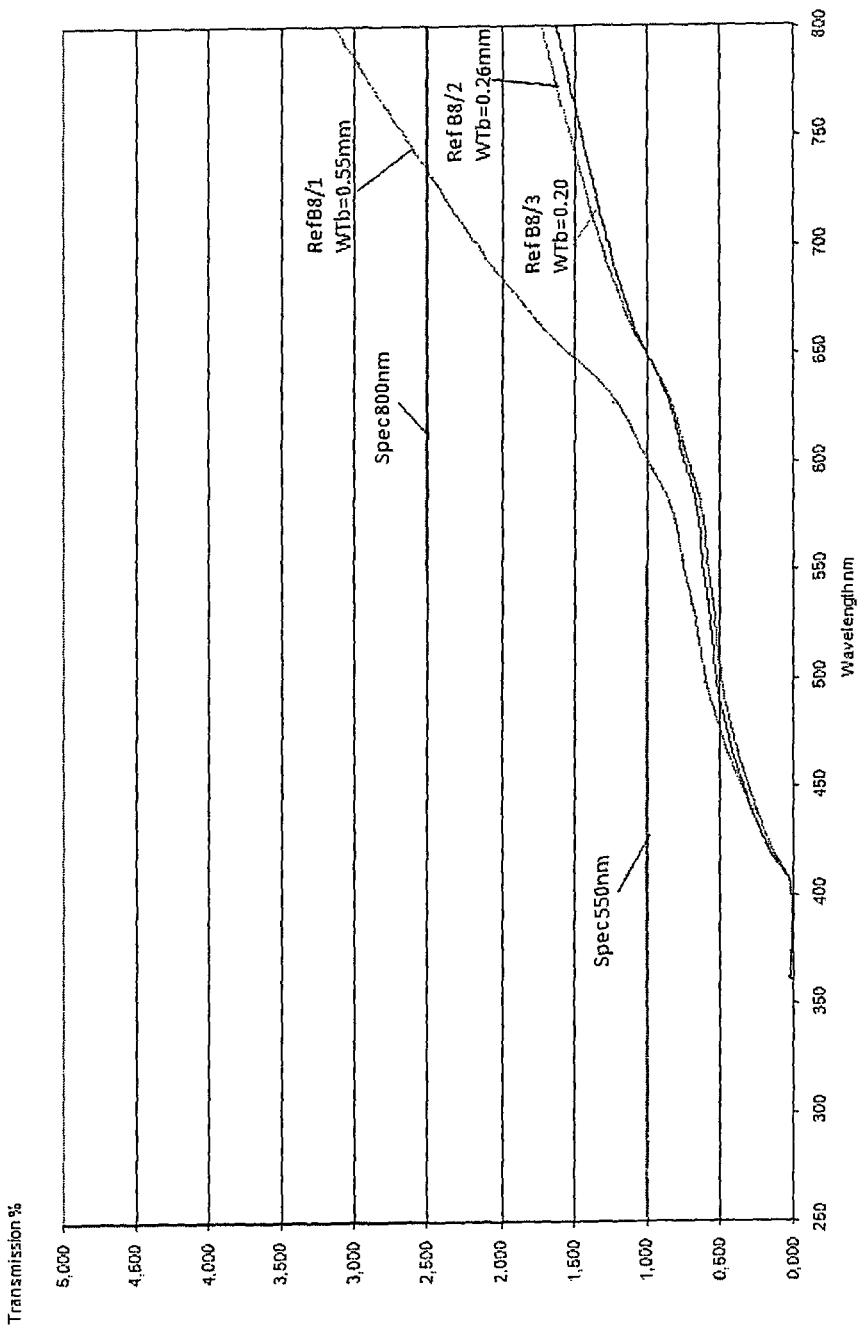
Figure 11:
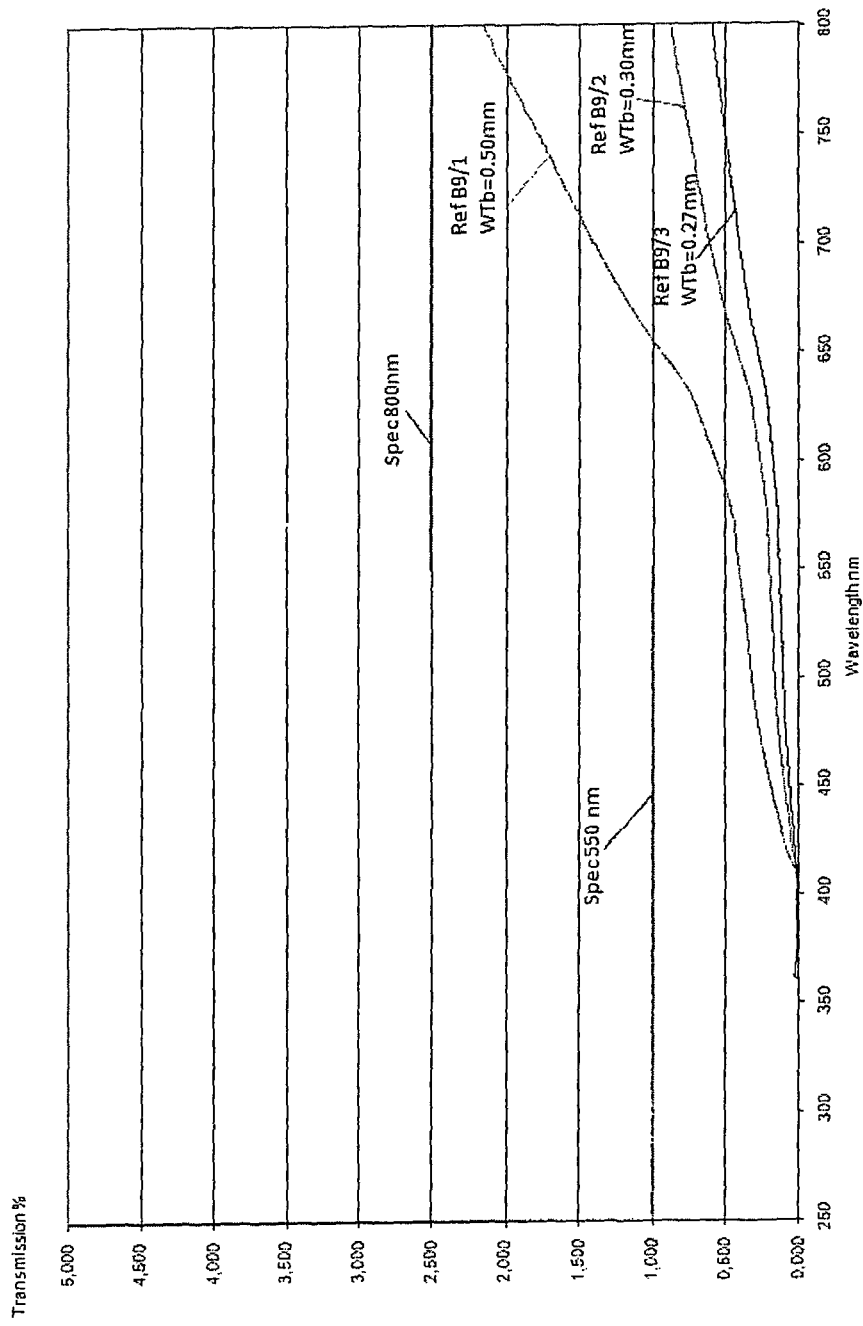

The light transmission spectra of FIGS. 8 to 11 show that the amount of silica particle has an impact on the light transmission properties. With higher amount of silica particles (FIGS. 8 and 11), the light transmission for wavelength up to 800 nm are lower than with lower amount of silica particles (FIGS. 9 and 10). In particular, bottles B6 and B9 made from composition n°3 still exhibit very low light transmission properties up to 800 nm. In particular, the light transmission of bottles B6 and B9 is still less than 1% at 550 nm and less than 2.5% at 800 nm, and these bottles can thus be used for storing products that are sensitive to UV radiations and visible light radiations up to 800 nm. In return, for bottles B7 and B8 the light transmission at 800 nm is higher than 2.5%, and these bottles does not fulfil the standard market species for storing light sensitive products, such as for example dairy products.

In a preferred embodiment of the invention, the amount of mineral particles in the polymeric composition will be preferably sufficiently high, in order to obtain a bottle having a light transmission through wall 2'a that is less than 1% at 550 nm and less than 2.5% at 800 nm.

$O_2$ Barrier Properties—FIGS. 12 and 13

Referring to FIG. 12, all the bottles B1 to B5 are made from the same composition N°4 but exhibits different stretch ratios. Bottles B1, B2 and B5 having a total stretch ratio (TSR) not more than 9, exhibit very good $O_2$ barrier and very good $O_2$ scavenging properties. In particular, the $O_2$ dissolved ingress of bottles B1, B2 and B5 is always less than 1 ppm after 180 days, and more particularly less than 0.5 ppm after 180 days. In practise, these bottles are actually characterized by an $O_2$ dissolved ingress of less than 1 ppm/year. In return, bottles B3 and B4, with a total stretch ratio (TSR) higher than 9 exhibit very poor $O_2$ barrier properties and very poor $O_2$ scavenging properties, and in particular are characterized by an $O_2$ dissolved ingress higher than 1 ppm after 15 days.

These results demonstrate that the stretch ratio has an impact on the $O_2$ barrier properties. High stretch ratios deteriorate the $O_2$ barrier properties of the bottles.

In a preferred embodiment of the invention, the stretch ratios of the bottle will be preferably sufficiently low in order to obtain a bottle characterized by an $O_2$ dissolved ingress of less than 1 ppm after at least 180 days.

Referring to FIG. 13, bottles B1, B6 and B9 exhibit very good $O_2$ barrier properties, and more particularly very good $O_2$ scavenging properties. In particular, the $O_2$ dissolved ingress of bottles B1, B2 and B9 is always less than 1 ppm after 240 days. More especially, bottles B6 and B9 made from composition N°1, i.e. a composition having a lower amount of silica particles than composition N°4 of bottles B1 and B3, exhibit the best $O_2$ barrier properties. In particular, if we compare bottles B6 and B3 having the same total stretch ratios higher than 9, the $O_2$ barrier properties of bottles B6 with lower amount of silica particles are very good, and in return the $O_2$ barrier properties of bottles B3 with higher amount of silica particles are poor.

These results demonstrate that the amount of silica particles in the polymeric composition of the bottle has surprisingly a very strong impact on the $O_2$ barrier properties. High amount of silica particles deteriorate the $O_2$ barrier properties of the bottles.

Based on this discovery, in a preferred embodiment of the invention, the amount of mineral particles in the polymeric composition will be adjusted in order to be sufficiently low for obtaining a bottle characterized by an $O_2$ dissolved ingress of less than 1 ppm after at least 180 days.

The experimental results show that a good compromise for obtaining a packaging article having both high oxygen-barrier properties and low light transmission characteristics up to 800 nm is to practise preferably an amount of mineral particles that is preferably not more than 26 wt % of the total weight of the polymeric material, and even more preferably less than 25 wt % of the total weight of the polymeric material, and that is preferably not less than 20 wt % of the total weight of the polymeric material, and even more preferably not less than 22 wt % of the total weight of the polymeric material. The invention is however not limited to this particular weight percentage range.

The invention claimed is:

1. A packaging article made from a polymeric material having oxygen barrier properties and low light transmission characteristics, said material comprising (A) a polyester, (B) micrometrical mineral particles, (C) a polyamide, and (D) at least one transition metal catalyst, wherein the amount of micrometrical mineral particles is not less than 20 wt % of the total weight of the material and is not more than 26 wt % of the total weight of the material.

2. The material of claim 1, wherein the amount of mineral particles is less than 25 wt % of the total weight of the material.

3. The material of claim 1, wherein the amount of mineral particles is not less than 22 wt % of the total weight of the material.

4. The material of claim 1, wherein the micrometrical particles have a size between 1 μm and 20 μm.

5. The material of claim 1, wherein the micrometrical particles have an average size of 3 μm.

6. The material of claim 1, wherein the mineral particles comprise silica particles.

7. The material of claim 6, wherein the silica particles contain at least 90 wt % of $SiO_2$.

8. The material of claim 6, wherein the silica particles comprise cristobalite particles and/or quartz particles.

9. The material of claim 1, wherein the amount of polyamide (C) is not less than 2 wt % of the total weight of the material.

10. The material of claim 1, wherein the polyamide is a xylylene group containing polyamide.

11. The material of claim 1, wherein the amount of polyester (A) is at least 50 wt % of the total weight of the material.

12. The material of claim 1, wherein the polyester (A) comprises a homo or copolymer of PET.

13. The material of claim 1, wherein the transition metal catalyst (D) is selected from the group: cobalt compound, rhodium compound, copper compound, iron compound.

14. The material of claim 1, wherein the transition metal catalyst (D) is a cobalt salt.

15. The material of claim 1, further comprising a dyeing agent.

16. The material of claim 1, further comprising $TiO_2$.

17. The material of claim 16, wherein the amount of $TiO_2$ is higher than 3 wt % of the total weight of the material.

18. The material of claim 16, wherein the amount Of $TiO_2$ is not more than 5 wt % of the total weight of the material.

19. The material of claim 1, being suitable to be injected and stretched-blow moulded in order to form rigid hollow containers.

20. The packaging article of claim 1, and consisting in a monolayer article.

21. The packaging article of claim 1, selected from the group: preform, rigid container, flexible container, film, sheet.

22. The packaging article of claim 1, consisting in a biaxially stretched container, and more particularly an injection stretch blow moulded container.

23. The packaging article of claim 1, comprising a wall ($2'a$) and having a light transmission through the wall that is less than 2.5% at 800 nm.

24. The packaging article of claim 1, comprising a wall ($2'a$) and having a light transmission through the wall that is less than 1% at 550 nm.

25. The packaging article of claim 1, characterized by an $O_2$ dissolved ingress that is less than 1 ppm, after a storage period of at least 180 days.

26. The packaging article of claim 1, characterized by an $O_2$ dissolved ingress that is less than 0.5 ppm, after a storage period of at least 180 days.

27. The packaging article of claim 1, comprising a stretched wall and wherein the stretching of the wall is sufficiently low in order to obtain an $O_2$ dissolved ingress that is less than 1 ppm, after a storage period of at least 180 days.

28. The packaging article of claim 1, consisting in a biaxially stretched container that is characterized by a total stretch ratio (TSR) of not more than 9.

29. The use of the packaging article of claim 1, for storing a product that is sensible to UV radiations and/or visible light radiations.

30. The material of claim 7, wherein the silica particles contain at least 95 wt % of $SiO_2$.

31. The material of claim 30, wherein the silica particles contain at least 99 wt % of $SiO_2$.

32. The material of claim 9, wherein the amount of polyamide (C) is not less than 5 wt % of the total weight of the material.

33. The material of claim 11, wherein the amount of polyester (A) is at least 60 wt % of the total weight of the material.

34. The material of claim 14, wherein the cobalt salt is cobalt stearate.

35. The packaging article of claim 27, wherein the stretching of the wall is sufficiently low in order to obtain an $O_2$ dissolved ingress that is less than 0.5 ppm, after a storage period of at least 180 days.

* * * * *

UNITED STATES PATENT AND TRADEMARK OFFICE
CERTIFICATE OF CORRECTION

PATENT NO.       : 8,865,278 B2
APPLICATION NO.  : 13/139652
DATED            : October 21, 2014
INVENTOR(S)      : Krikor et al.

It is certified that error appears in the above-identified patent and that said Letters Patent is hereby corrected as shown below:

In the Claims
Column 16, line 14, claim 23, delete "(2'a)"

Column 16, line 17, claim 24, delete "(2'a)"

Signed and Sealed this
Twenty-sixth Day of May, 2015

Michelle K. Lee
*Director of the United States Patent and Trademark Office*